United States Patent
Yeh et al.

(10) Patent No.: US 7,719,863 B2
(45) Date of Patent: May 18, 2010

(54) ACTIVE START JUDGMENT CIRCUIT

(75) Inventors: Fun-Son Yeh, Taipei (TW); Chun-Yuan Chou, Taipei (TW)

(73) Assignee: Shuttle, Inc., Taipei (TW)

( * ) Notice: Subject to any disclaimer, the term of this patent is extended or adjusted under 35 U.S.C. 154(b) by 327 days.

(21) Appl. No.: 12/018,092

(22) Filed: Jan. 22, 2008

(65) Prior Publication Data

US 2009/0185399 A1    Jul. 23, 2009

(51) Int. Cl.
*H02H 7/10*    (2006.01)

(52) U.S. Cl. .......................... 363/49; 363/50; 323/901; 323/908

(58) Field of Classification Search ........................ None
See application file for complete search history.

(56) References Cited

U.S. PATENT DOCUMENTS

| | | | |
|---|---|---|---|
| 7,221,111 B2 * | 5/2007 | Hirosawa | 315/360 |
| 7,592,790 B2 * | 9/2009 | Yang | 323/277 |
| 2002/0024825 A1 * | 2/2002 | Wu et al. | 363/21.01 |
| 2004/0119449 A1 * | 6/2004 | Matley | 323/234 |
| 2007/0247879 A1 * | 10/2007 | Yang | 363/49 |
| 2008/0094047 A1 * | 4/2008 | Huynh et al. | 323/282 |
| 2008/0259649 A1 * | 10/2008 | Marchand et al. | 363/21.03 |
| 2009/0167267 A1 * | 7/2009 | Dwarakanath et al. | 323/282 |

* cited by examiner

*Primary Examiner*—Bao Q Vu
(74) *Attorney, Agent, or Firm*—Stites & Harbison PLLC; Juan Carlos A. Marquez, Esq.

(57) ABSTRACT

An active start judgment circuit is electrically connected to an AC/DC transforming power supply which has at least one standby power unit to transform AC to DC in regular conditions and a main power unit to transform the AC to the DC in an ON condition for operation of an electronic equipment. The start judgment circuit bridges the standby power unit and the main power unit, and generates a reference potential based on a voltage output from the standby power unit, and gets a power signal from the standby power unit to be compared with the reference potential to output a start signal to the main power unit to transform the AC to the DC. Thus the standby power unit can actively drive the main power unit to supply DC power to activate the electronic equipment.

8 Claims, 2 Drawing Sheets

ACTIVE START JUDGMENT CIRCUIT

FIELD OF THE INVENTION

The present invention relates to a start judgment circuit and particularly to an active start judgment circuit to actively start an electronic equipment through a standby power unit.

BACKGROUND OF THE INVENTION

Some personal computers or special computers such as large industrial computers do not have a start/stop button or have the start/stop switch located at a position difficult to access by users. Hence providing an automatic start function is required. Take the personal computer as an example. The motherboard adopted ATX (Advanced Technology eXtended) specification is widely used that has a power supply including at least one main power system and one standby power system. The main power system mainly aims to transform AC of an external power source to DC in an ON condition to supply the motherboard. The standby power provides standby power to maintain continuous operation of the motherboard whether in the ON or OFF condition as long as the power supply is electrically connected. It usually is +5V. Namely while the power supply is connected to the external power source, the motherboard has a small loading current to provide basic power required to start the computer. In general, as the motherboard always has this loading current the computer can be started by depressing a pushbutton like a conventional power supply. Moreover, it also can be started through a network, peripheral devices (such as mouse, keyboard) or a timer. All these start operations require a trigger action from users. This has to be done through a medium to provide an active start signal to activate the computer.

Although most motherboards at present provide automatic start function, namely a direct start takes place after being connected to electric power. However, power supply system management still has to be set in advance in the Basic Input/Output System (BIOS) so that the host can be driven and started after the power supply system of the computer is electrically energized. Such an automatic start method relies on a battery power on the motherboard rather than the standby power. Hence trying to do automatic start by setting the BIOS could fail due to insufficient battery power of the motherboard.

SUMMARY OF THE INVENTION

The primary object of the present invention is to provide active start for an electronic equipment (such as a computer) in an electrically connecting condition by getting and transforming standby power to a start signal to actively start the electronic equipment. To achieve the foregoing object the invention provides an active start judgment circuit which is electrically connected to an AC/DC transforming power supply. The power supply has at least one standby power unit to transform AC to DC in regular conditions and a main power unit to transform the AC to the DC in an ON condition to provide operation power for the electronic equipment. The start judgment circuit bridges the standby power unit and the main power unit. Based on a voltage output from the standby power unit, a reference potential is generated. And a power signal is got from the standby power unit to be compared with the reference potential, then a start signal is output to the main power unit to transform the AC to the DC.

By means of the invention once the power supply is connected to the external power, the power signal provided by the standby power is obtained to be actively transformed to the start signal to order the main power to supply electric power. As the standby power unit continuously provides steady standby power to the motherboard even in an OFF condition, power start failure caused by insufficient battery power or erroneous setting that occurs to the conventional automatic start mode can be prevented.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
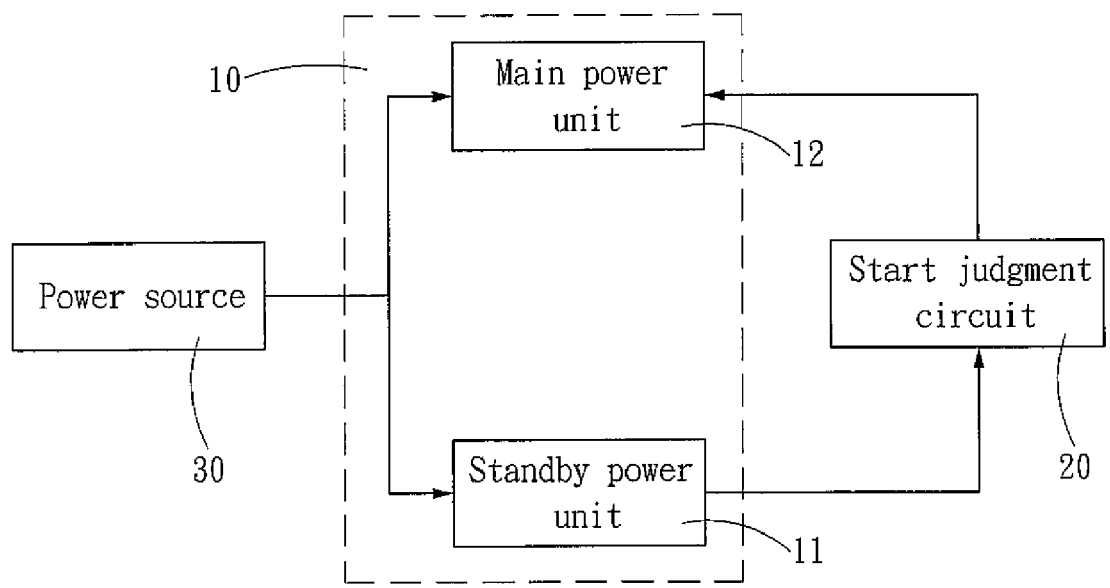
FIG. 1 is a circuit block diagram of an embodiment of the active start judgment circuit of the invention.
Figure 2:
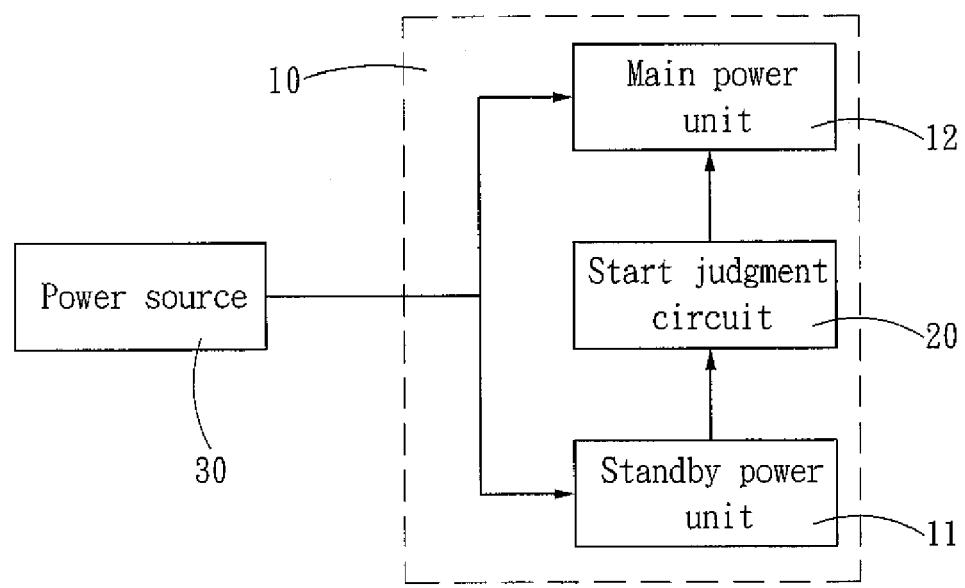
FIG. 2 is a circuit block diagram of an embodiment of the active start judgment circuit of the invention installed in a power supply.

Please refer to FIG. 1 for the circuit block diagram of an embodiment of the invention. The invention provides an active start judgment circuit 20 which is electrically connected to an AC/DC transforming power supply 10 to receive AC power from an external power source 30. The power supply 10 includes at least one standby power unit 11 to receive and transform AC to DC in regular conditions and a main power unit 12 to transform the AC to the DC in an ON condition for operation of an electronic equipment. The active start judgment circuit 20 is located between the standby power unit 11 and the main power unit 12. Based on an output voltage of the standby power unit 11, a reference potential is generated. A power signal also is got from the standby power unit 11 to be compared with the reference potential to output a start signal to the main power unit 12 to transform the AC to the DC. The active start judgment circuit of the invention may be independently located outside the power supply 10 (referring to FIG. 1), or inside the power supply 10 (referring to FIG. 2).

Figure 3:
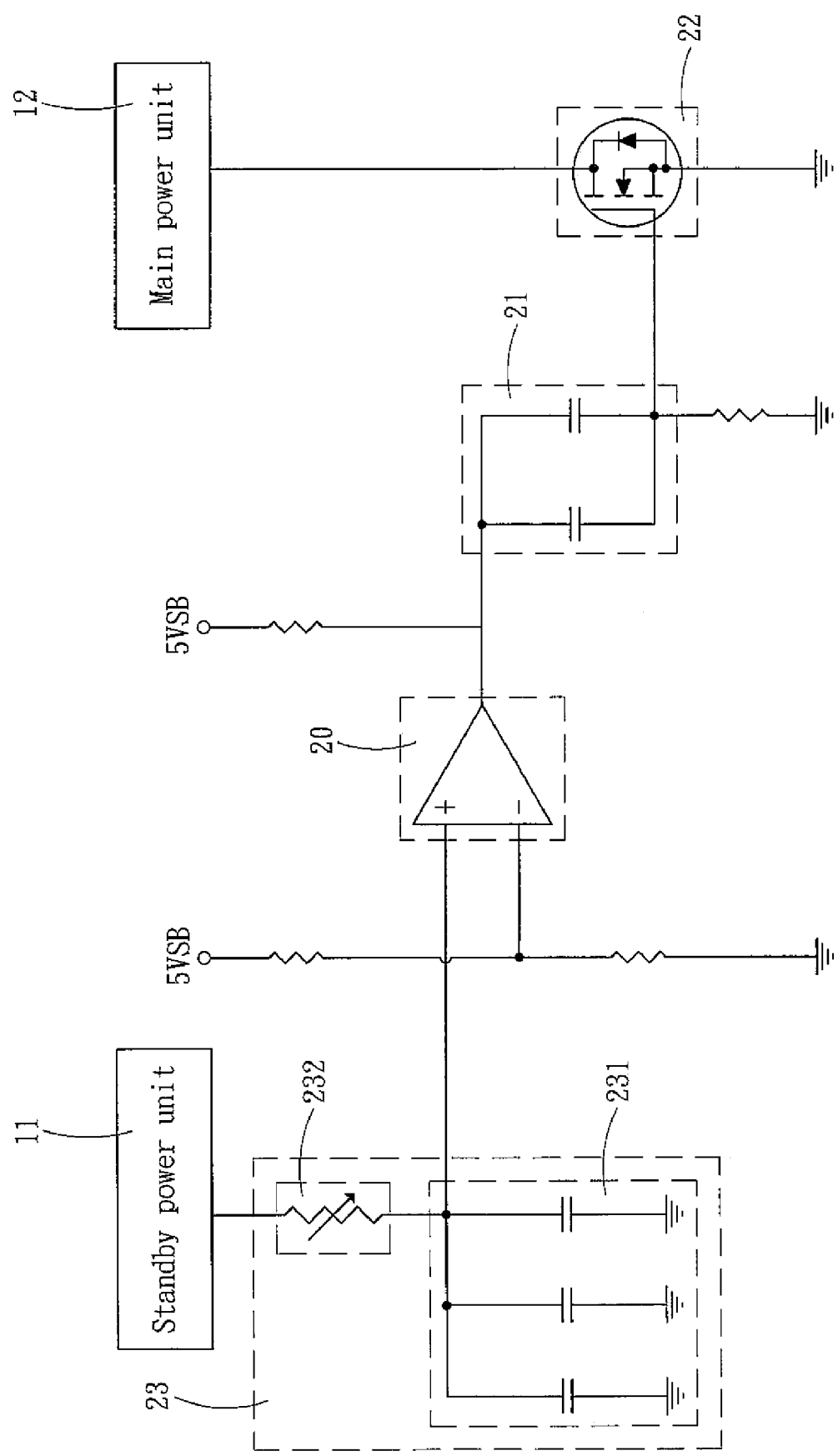
FIG. 3 is a circuit diagram of an embodiment of the active start judgment circuit of the invention.

Refer to FIG. 3 for the circuit diagram of an embodiment of the active start judgment circuit of the invention. The active start judgment circuit 20 is located between the main power unit 12 and the standby power unit 11. It is a comparison circuit to compare the reference potential with the power signal. The start judgment circuit 20 and the main power unit 12 are bridged by an ON/OFF circuit 22. The ON/OFF circuit 22 receives the start signal and transforms it to an ON/OFF signal to activate the main power unit 12. When the power supply 10 is electrically connected to the external power source 30 (such as a socket), the standby power unit 11 transforms AC to DC and provides a steady standby voltage. The start judgment circuit 20 of the invention gets the reference potential through resistor voltage division of the standby voltage. The standby power unit 11 also gets the power signal of input power. The power signal and the reference potential are fed to the start judgment circuit 20. In this embodiment a conversion unit 21 may be provided between the start judgment circuit 20 and the ON/OFF circuit 22 to convert the start signal to trigger the ON/OFF circuit 22 to output the ON/OFF signal. In the event that the power signal is higher than the reference potential, the start judgment circuit 20 outputs the start signal to the conversion unit 21 that is converted to trigger the ON/OFF circuit 22. The ON/OFF circuit 22 may include switch elements such as MOS transistors. After the ON/OFF circuit 22 has received the start signal, the start signal is converted to the ON/OFF signal be output to the main power unit 12 to transform the AC to the DC to support operation of the electronic equipment.

In order to regulate the timing of the main power unit 12, the start judgment circuit 20 may further be connected to a time series circuit 23 to determine the time series of the start signal. In this embodiment the time series circuit 23 is located between the standby power unit 11 and the start judgment circuit 20. The time series circuit 23 receives the power signal from the standby power unit 11 and determines the voltage boosting speed of the power signal. When the power signal is greater than the reference potential of the start judgment circuit 20, the start judgment circuit 20 sends the start signal to the ON/OFF circuit 22 to trigger the ON/OFF circuit 22. Then the ON/OFF signal is generated on the main power unit 12. In addition, the time series circuit 23 includes at least one set of capacitor cluster 231 to charge or discharge the power signal. When the power supply 10 is initially connected to an electric source the power signal generated by the standby power unit 11 enters the time series circuit 23 until the capacitor cluster 231 is saturated. Then the power signal is sent to the start judgment circuit 20 to be compared with the reference potential. The time series circuit 23 may also include a variable resistor 232 to control the voltage boosting time of the power signal by adjusting the resistance thereof. Thereby the time to generate the driving signal of the start judgment circuit 20 can be regulated later on. Even the start time of the main power unit 12 can be altered through this approach.

In the event that the power supply 10 is connected to the external power source 30, the standby power unit 11 directly receives AC power from the external power source 30 and transforms it to DC power to supply a steady +5V standby power to become the power signal which can be directly fed to the start judgment circuit 20 and compared with the reference potential received by the start judgment circuit 20. In the event that the power signal is greater than the reference potential, a start signal is generated on the main power unit 12 to start the main power unit 12 to transform the AC power to the DC power. The power signal provided by the standby power unit 11 may also enter first to the time series control circuit 23 to regulate the comparison time of the power signal and the reference potential. Thereby the duration of the time series to do overall start can be regulated. The start signal generated by the start judgment circuit 20 can also trigger the ON/OFF circuit 22 to output an ON/OFF signal to the main power unit 12 to perform AC/DC transformation.

As a conclusion, after the power supply 10 is connected to an electric source the invention directly gets the power signal generated by the standby power unit 11 during transforming the AC power. The power signal goes through the start judgment circuit 20 to be converted to a start signal to be sent to the main power unit 12 to do AC/DC transformation and supply power to the electronic equipment for operation. Compared with the conventional machine start method, the invention does not require a trigger signal from the user to activate the main power unit 12 through the standby power. Once the standby power unit 11 receives power from a power source, the start judgment circuit 20 actively drives the main power unit 12 to do operation. Moreover, compared with the conventional automatic machine start process which has to preset the power supply system in the BIOS to allow the battery to supply power to drive the main power unit, the invention directly uses the power signal generated by the standby power unit 11 as a start trigger signal. Once the power supply 10 is connected to an electric source, the standby power unit 11 can continuously supply standby power in a steady and convenient manner. It provides a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An active start judgment circuit electrically connected to an AC/DC transforming power supply which has at least one standby power unit to transform AC to DC in regular conditions and a main power unit to transform the AC to the DC in an ON condition for operation of an electronic equipment, wherein:

the start judgment circuit is located between the standby power unit and the main power unit to generate a reference potential based on a voltage output from the standby power unit and receives a power signal from the standby power unit to be compared with the reference potential to output a start signal to the main power unit to transform the AC to the DC.

2. The active start judgment circuit of claim 1, wherein the start judgment circuit is a comparison circuit to compare the reference potential with the power signal.

3. The active start judgment circuit of claim 1, wherein the start judgment circuit is electrically connected to a time series control circuit to determine output time series of the start signal.

4. The active start judgment circuit of claim 1, wherein the start judgment circuit and the main power unit are bridged by an ON/OFF circuit which receives the start signal and transforms to an ON/OFF signal to activate the main power unit.

5. The active start judgment circuit of claim 4, wherein the start judgment circuit is electrically connected to a time series control circuit to determine output time series of the start signal.

6. The active start judgment circuit of claim 4, wherein the start judgment circuit and the ON/OFF circuit are bridged by a conversion unit to convert the start signal to trigger the ON/OFF circuit to output the ON/OFF signal.

7. The active start judgment circuit of claim 6, wherein the start judgment circuit is electrically connected to a time series circuit to determine output time series of the start signal.

8. The active start judgment circuit of claim 1, wherein the start judgment circuit is located in the power supply.

* * * * *